(12) United States Patent
Guibet

(10) Patent No.: US 9,683,868 B2
(45) Date of Patent: Jun. 20, 2017

(54) SENSOR COMPRISING A MAGNET AND A HALL-EFFECT PROBE

(71) Applicant: SC2N, Creteil (FR)

(72) Inventor: Vincent Guibet, Vaucelles (FR)

(73) Assignee: SC2N, Creteil (FR)

( * ) Notice: Subject to any disclaimer, the term of this patent is extended or adjusted under 35 U.S.C. 154(b) by 0 days.

(21) Appl. No.: 14/377,938

(22) PCT Filed: Feb. 14, 2013

(86) PCT No.: PCT/FR2013/050303
§ 371 (c)(1),
(2) Date: Aug. 11, 2014

(87) PCT Pub. No.: WO2013/121153
PCT Pub. Date: Aug. 22, 2013

(65) Prior Publication Data
US 2015/0035527 A1    Feb. 5, 2015

(30) Foreign Application Priority Data

Feb. 16, 2012   (FR) ..................... 12 51433

(51) Int. Cl.
*G01R 33/06* (2006.01)
*G01D 5/14* (2006.01)
*G01V 3/08* (2006.01)

(52) U.S. Cl.
CPC .............. *G01D 5/147* (2013.01); *G01V 3/08* (2013.01)

(58) Field of Classification Search
CPC ........ G01B 7/023; G01D 5/145; G01D 5/147; G01D 5/2451; G01D 5/2515; G01R 33/09; G01R 33/095; G01R 33/0035; G01R 33/072; G01R 33/091; G01P 3/487; G01P 3/488
See application file for complete search history.

(56) References Cited

U.S. PATENT DOCUMENTS

| | | | | |
|---|---|---|---|---|
| 3,663,843 | A * | 5/1972 | Smith | ...................... H01L 43/06 257/E43.002 |
| 5,321,355 | A * | 6/1994 | Luetzow | ................. G01B 7/023 324/174 |
| 5,637,995 | A | 6/1997 | Izawa et al. | |
| 7,459,905 | B2 * | 12/2008 | Kurumado | ........... G01D 5/2451 324/174 |
| 9,116,018 | B2 * | 8/2015 | Frachon | ................. G01D 5/147 |
| 2008/0238415 | A1 * | 10/2008 | Bauer | .................... G01D 5/145 324/207.25 |

FOREIGN PATENT DOCUMENTS

| | | |
|---|---|---|
| FR | 2 724 723 A1 | 3/1996 |
| JP | 58-45501 A | 3/1983 |

OTHER PUBLICATIONS

International Search Report for corresponding International Application No. PCT/FR2013/050303, mailed Jul. 24, 2013 (2 pages).

* cited by examiner

*Primary Examiner* — Minh N Tang
(74) *Attorney, Agent, or Firm* — Osha Liang LLP

(57) ABSTRACT

A sensor includes a Hall-effect probe fastened only by way of its connection pins and includes a sensing element, a magnet having a cavity having a base, and in which cavity the sensing element is housed, and a cylindrical hole having an axis and which extends from the base toward the interior of the magnet, the Hall-effect probe being capable of moving inside the cavity.

11 Claims, 3 Drawing Sheets

SENSOR COMPRISING A MAGNET AND A HALL-EFFECT PROBE

CROSS-REFERENCE TO RELATED APPLICATIONS

This application is a national stage application of PCT/FR2013/050303 filed Feb. 14, 2013, which claims priority to FR 1251433 filed Feb. 16, 2012.

STATEMENT REGARDING FEDERALLY SPONSORED RESEARCH OR DEVELOPMENT

Not applicable

THE NAMES OF PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION

Field of the Invention

The present invention relates to a sensor comprising a magnet and a Hall-effect probe and intended to detect if a mobile metal object is in front of the Hall-effect probe, as well as a magnet for such a sensor.

Description of Related Art

To check the presence of a mobile metal object, it is known to use a sensor comprising a magnet coupled to a Hall-effect probe.

Such a sensor is used for example to detect the position of the axis of the dog clutch of a gearbox, or else the position of the camshaft. FIG. 1 shows a curve 10 that represents the variations in magnetic induction as a function of the position of the mobile object with respect to the Hall-effect probe. The value of the magnetic induction decreases when the mobile object moves away from the Hall-effect probe.

Currently, manufacturers in particular of motor vehicles, require that the position of the mobile object with respect to the Hall-effect probe be determined from the start-up of the sensor. This function is called TPO (True Power On.)

This function thus makes it possible to determine at start-up whether or not the mobile object is facing the Hall-effect probe. To do this, a magnetic induction threshold value 12 is set in the factory.

Thus, when the sensor starts up, if the value of the magnetic induction seen by the Hall-effect probe is above the threshold value 12, this is interpreted as the fact that the mobile object is facing the Hall-effect probe. If, on the contrary, when the sensor starts up, the value of the magnetic induction seen by the Hall-effect probe is below the threshold value 12, this is interpreted as the fact that the mobile object is not facing the Hall-effect probe.

Over the lifetime of the sensor, it can happen that the Hall-effect probe moves with respect to the magnet and then the magnetic induction value changes. The curve 14 is the curve representing the variations in magnetic induction after movement of the Hall-effect probe.

As can be seen in FIG. 1, the threshold value 12 is no longer reached after the movement of the Hall-effect probe and the TPO function is no longer fulfilled.

To solve this problem, it is known practice to fasten the Hall-effect probe in the sensor and therefore to make the Hall-effect probe immobile with respect to the magnet. The fastening is performed for example by casting resin in the sensor, thereby encircling the Hall-effect probe.

Such a solution has other disadvantages. For example, the fastening of the Hall-effect probe leads to the appearance of mechanical stresses due to the thermal expansions in the Hall-effect probe and in particular at the level of the welds. Furthermore, the placing of the resin is burdensome and requires the use of an appropriate machine.

From the document U.S. Pat. No. 5,637,995 a sensor is known composed of a probe including a sensitive element, a permanent magnet, a casing and a hood. The permanent magnet has a recess and a through hole running along the central axis of the permanent magnet. The through hole communicates with the recess. The probe runs along the through hole and into the recess, the sensitive element being housed at the level of the recess. The permanent magnet and the probe are held in place by the casing and the hood. The probe is held in place in the magnet in order to come permanently in contact with the hood.

BRIEF SUMMARY OF THE INVENTION

An object of the present invention is to propose a sensor comprising a magnet and a Hall-effect probe that do not have the drawbacks of the prior art.

For this purpose, a sensor is proposed including:
a Hall-effect probe including a sensitive element,
a magnet having a recess having a bottom and wherein the sensitive element is housed, and a cylindrical hole with an axis and which runs from said bottom to the inside of the magnet,
the Hall-effect probe being liable to move inside the recess.

The cylindrical hole makes it possible to lower the magnetic induction, particularly in such a way that the latter reaches a value of around zero Gauss at the level of the sensitive element of the Hall-effect probe.

The cylindrical hole can have a circular transverse cross section.

The bottom of the recess can define a transverse plane, in particular perpendicular to the axis of the cylindrical hole.

The Hall-effect probe can be housed in the recess.

This plane can form an end stop for the movement of the Hall-effect probe along the axis of the cylindrical hole.

In other words, the movement of the Hall-effect probe inside the recess can involve no movement of the latter inside the cylindrical hole.

During its movement inside the recess, the probe can remain outside the hole. The dimension, measured perpendicular to the axis of the cylindrical hole of the probe, is in particular greater than the dimension of the cylindrical hole, perpendicular to the axis of the cylindrical hole.

The movement of the probe can take place exclusively outside the hole.

Advantageously, the Hall-effect probe does not house, even partially, in the cylindrical hole.

Advantageously, the cylindrical hole is blind, i.e. only one of the ends of the hole along its axis is open, the other being closed.

The recess can open out onto the outside of the magnet via two apertures arranged in parallel with the axis of the hole. These apertures can be made in the hole or not.

The cylindrical hole can open out onto the outside of the magnet via two apertures arranged in parallel with the axis of said hole.

Owing to these apertures, the existence of thin walls of the magnet arranged in parallel with the axis of the hole and around said hole can be avoided.

The apertures can be diametrically opposed about the axis of the hole.

In an exemplary embodiment of the invention, the hole is blind and opens out onto the outside of the magnet via two apertures arranged in parallel with the axis of said hole. In other words, according to this exemplary embodiment of the invention, one of the ends of the hole along its axis is closed and two apertures are made on either side of said axis, the apertures being in particular diametrically opposed.

Advantageously, the dimensions of the magnet are such that during the movements of the Hall-effect probe, the value of the magnetic induction perceived by the sensitive element remains substantially constant.

The dimensions of the magnet are in particular such that the variations in the magnetic induction perceived by the sensitive element during the movements of the Hall-effect probe are not liable to move the curve representing the magnetic field with respect to the threshold value corresponding to the TPO. The TPO function therefore remains operational.

In other words, the dimensions of the magnet can be such that, within the tolerance range of the movements of the Hall-effect probe, the value of the magnetic induction perceived by the sensitive element remains substantially constant.

Thus, it is then not necessary to fasten the Hall-effect probe with resin and there is therefore no appearance of mechanical stresses on the Hall-effect probe and the TPO function remains operational.

The recess can have a parallelepipedal shape. The probe can then have a shape allowing it to be received in the recess.

The sensor can comprise a support and the Hall-effect probe can be fastened to this support, for example solely by way of connection leads.

These leads can be flexible and this flexibility of the connection leads of the probe can allow the probe to move in the recess.

The magnet and the Hall-effect probe can each be linked, directly or otherwise, to one and the same support. The magnet and the Hall-effect probe can each be joined onto this same support. The support can be a casing of the sensor.

The magnet and the Hall-effect probe can be not rigidly coupled together, contrary to what would be the case if a resin was used to immobilize the magnet with respect to the Hall-effect probe.

The magnet and the Hall-effect probe can thus both be linked to one and the same support without the magnet and the Hall-effect probe being rigidly coupled together.

The Hall-effect probe can move in the recess in a direction parallel with the axis of the hole and/or in a plane perpendicular to said axis.

The invention also proposes a magnet for a sensor according to one of the preceding embodiments, said magnet having a recess having a bottom and intended to house a sensitive element of a Hall-effect probe, and a cylindrical hole with an axis and which runs from said bottom to the inside of the magnet.

Advantageously, the cylindrical hole is blind.

BRIEF DESCRIPTION OF SEVERAL VIEWS OF THE DRAWINGS

The features of the invention mentioned above, as well as others, will become more clearly apparent upon reading the following description of an exemplary embodiment, said description being made with reference to the attached drawings, among which.

DETAILED DESCRIPTION OF THE INVENTION

Figure 1:
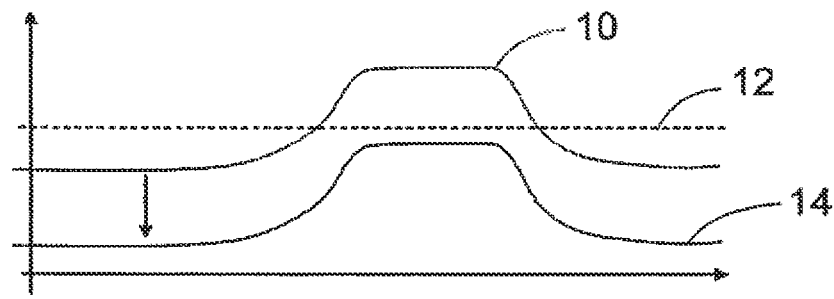
FIG. 1 represents a curve of the variations in a magnetic field of a sensor of the prior art.
Figure 2:
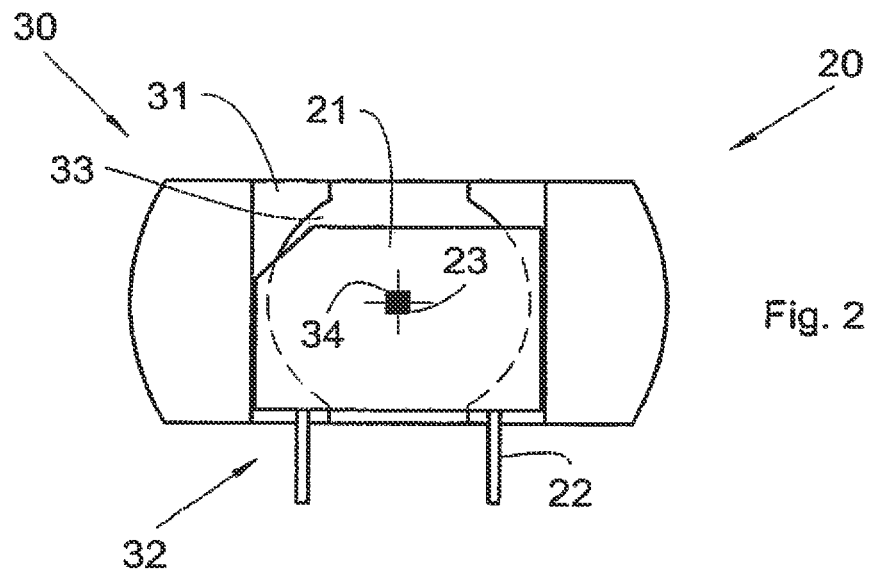
FIG. 2 shows a sensor according to the invention in a so-called front view.
Figure 3:
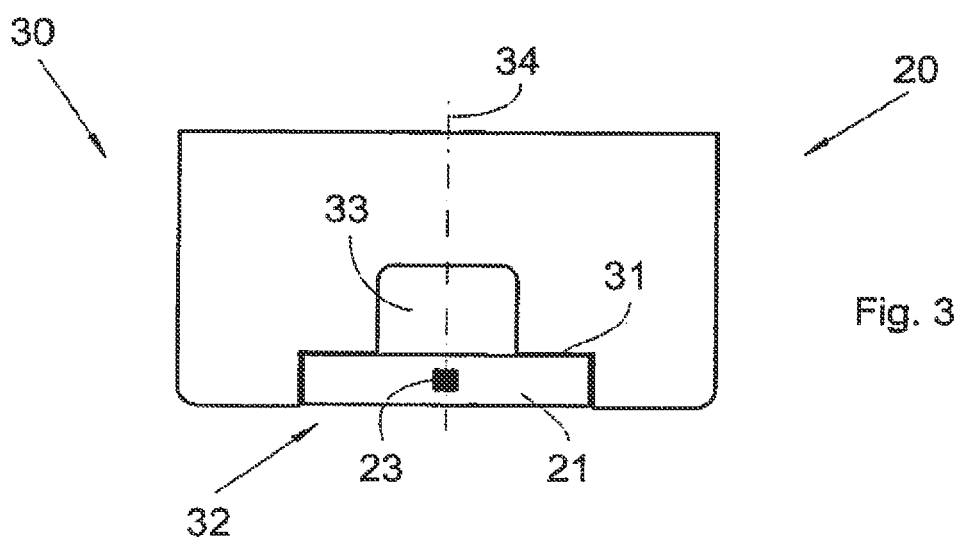
FIG. 3 shows the sensor in FIG. 2 in a top view.

FIG. 2 shows a sensor 20 according to the invention in a front view and FIG. 3 shows the sensor 20 in a top view. The sensor 20 comprises a magnet 30 and a Hall-effect probe 21.

The sensor 20 also includes a base, not represented, on which the magnet 30 is fastened. The Hall-effect probe 21 includes a sensitive element 23 and it is fastened onto a printed circuit board (not represented) or onto tabs by way of its connection leads 22. The printed circuit board is itself fastened onto the base, which can form a protective casing wherein the magnet 30, the Hall-effect probe 21 and the printed circuit board are housed.

The magnet 30 has an open recess 32 with a bottom 31 and wherein the Hall-effect probe 21 and more particularly the sensitive element 23 are housed.

In the example described, the recess 32 takes the shape of a parallelepiped which is limited by the bottom 31 and which is open on the face opposite the bottom 31. The parallelepiped is limited by the magnet 30, along two of its other parallel faces, and it is open along the two last parallel faces.

The Hall-effect probe 21 is sunk into the recess 32. A part of the magnet 30 is facing two of the parallel edges of the Hall-effect probe 21.

The magnet 30 also has a cylindrical hole 33 with an axis 34 and which runs from the bottom 31 to the inside of the magnet 30. The axis 34 is perpendicular to the bottom 31, i.e. to the plane in which the Hall-effect probe 21 extends.

The cylindrical hole 33 is blind. The dimensions of the hole 33 can depend on the dimensions of the magnet 30, particularly on its dimension along the axis 34 and on those in a plane perpendicular to this axis 34, and/or on the dimensions of the recess 32.

The magnet 30 is globally symmetrical with respect to one of the planes passing through the axis 34.

The preferred position of the sensitive element 23, when the sensor 20 is assembled, is such that the sensitive element 23 is housed in the recess 32 and positioned on the axis 34.

The Hall-effect probe 21 is not fastened by way of resin. In the example described, it is only fastened by way of its connecting leads 22 which leave the recess 32 via one of the two last open faces of the parallelepiped. The Hall-effect probe 21 is therefore liable to move with respect to the magnet 30 in a tolerance range around the preferred position. The tolerance range is defined by the manufacturing tolerances of the components, the tolerances of assembly of the components amongst themselves and the movements that occur over the lifetime of the sensor 20.

The sensitive element 23 is thus liable to move in the recess 32 in a first direction parallel with the axis 34 and in a plane parallel with the bottom 31 about the axis 34. The length of the bottom 31 is in particular determined to allow the introduction of the Hall-effect probe 21 and limit the movements of the Hall-effect probe 21 in the recess 32.

The dimensions of the magnet 30 are such that the variations in the magnetic induction perceived by the sensitive element 23 during the movements of the Hall-effect probe 21 are not liable to move the curve representing the magnetic field with respect to the threshold value corresponding to the TPO. The TPO function therefore remains operational.

In other words, the dimensions of the magnet 30 are such that, in the tolerance range of the movements of the Hall-effect probe 21, the value of the magnetic induction perceived by the sensitive element 23 remains substantially constant.

Thus, it is not necessary to fasten the Hall-effect probe 21 with resin and there is therefore no appearance of mechanical stresses on the Hall-effect probe 21 and the TPO function remains operational.

Figure 6:
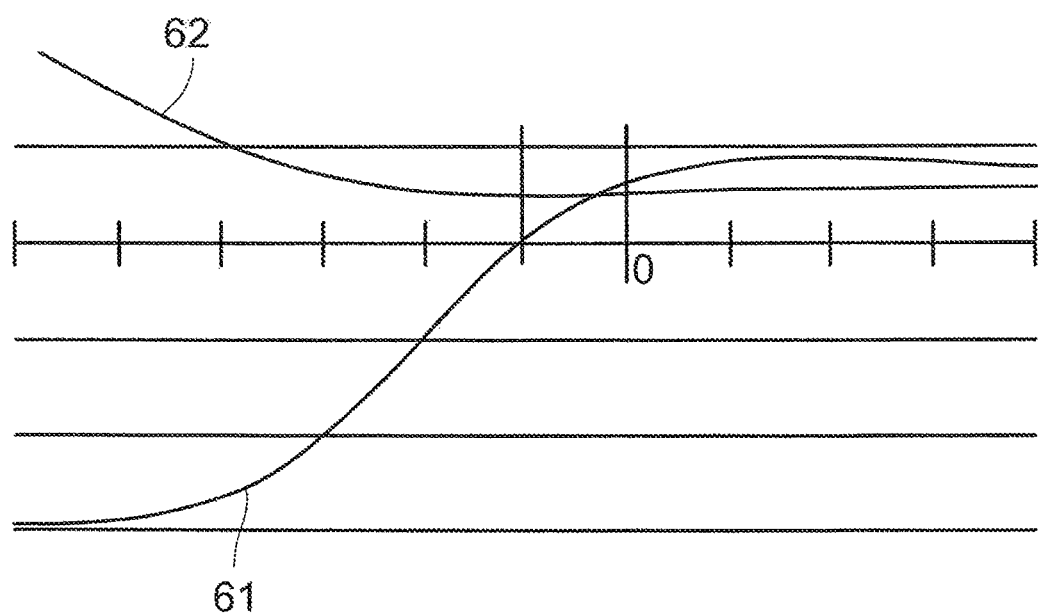
FIG. 6 shows a curve of the magnetic field for a sensor according to the invention.

FIG. 6 is a graph showing the magnetic induction perceived by the sensitive element 23 as a function of the position of the sensitive element 23 along the axis 34.

The zero of the abscissa axis corresponds to the theoretical position of the sensitive element 23 as it has been defined during the design of the sensor 20, i.e. when the sensitive element 23 is on the axis 34 and when the Hall-effect probe 21 is at the bottom of the recess 32. Each division of the abscissa axis corresponds to 0.5 mm. Due to the fact of its possible movement while remaining in the tolerance range, the real position of the Hall-effect probe 21 varies from 0 mm (position at the bottom of the recess 32) to −0.5 mm (position detached from the bottom of the recess 32).

The zero of the ordinate axis corresponds to 0 G. Each division of the ordinate axis corresponds to 500 G.

The curve 61 corresponds to the magnetic induction perceived by the sensitive element of a Hall-effect probe of a sensor of the prior art.

The curve 62 corresponds to the magnetic induction perceived by the sensitive element 23 of the Hall-effect probe 21 of the sensor 20 according to the invention.

In the case of the sensor of the prior art, the variation in the magnetic induction within the range of movement of the sensitive element is of around 300 G.

In the case of the sensor 30 according to the invention, the variation in the magnetic induction within the range of movement of the sensitive element 23 is in the order of 10 G.

The magnet 30 is for example obtained by molding. In a variant, the magnet is a compressed, sintered or machined magnet.

Figure 4:
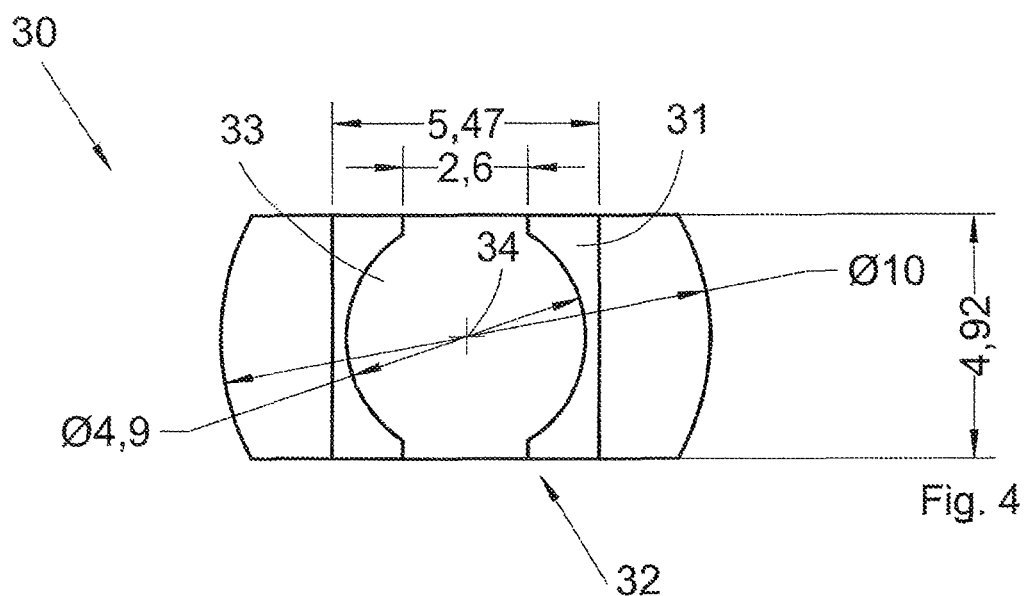
FIG. 4 shows a magnet for the sensor in FIG. 2 in a front view.
Figure 5:
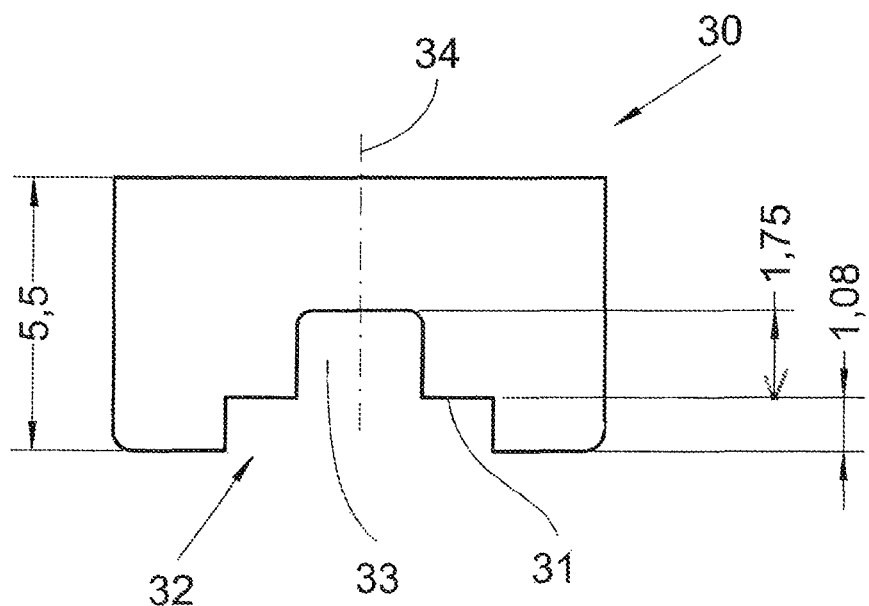
FIG. 5 shows the magnet in FIG. 4 in a side view.

FIG. 4 and FIG. 5 show a particular embodiment of the magnet 30 in a front view and a top view in the case where the Hall-effect probe 21 is a probe from INFINEON and bears the reference TLE 498x.

The magnet 30 is composed of a block of a height (measured along the axis 34) of 5.5 mm. The block is a portion of a cylinder of 10 mm in diameter centered on the axis 34. The cylinder is limited by two parallel planes symmetrical with respect to the axis 34. The distance between the two planes is of 4.92 mm.

The recess 32 possesses a rectangular shape centered on the axis 34 and perpendicular to the planes limiting the cylinder. The length of the bottom 31 parallel with the planes is of 5.47 mm and the width of the bottom 31 perpendicular to the planes is of 4.92 mm. The height of the recess 32 parallel with the axis 34 is of 1.08 mm.

The cylindrical hole 33 has a diameter of 4.9 mm and a height (measured along the axis 34) with respect to the bottom 31 of 1.75 mm. In the example under consideration the wall limiting the cylindrical hole 33 opens out onto each of the planes limiting the cylinder via a slit perpendicular to said plane and with a width of 2.6 mm distributed symmetrically on either side of the axis 34.

Of course, the present invention is not limited to the examples and embodiments described and represented, but it is open to many variants available to those skilled in the art.

The invention claimed is:

1. A sensor, comprising:
a Hall-effect probe comprising a sensitive element; and
a magnet having a recess having a bottom in which the sensitive element is housed, and a cylindrical hole with an axis which runs from said bottom to the inside of the magnet,
the Hall-effect probe being liable to move inside the recess,
the dimensions of the magnet being such that during the movements of the Hall-effect probe, a value of magnetic induction perceived by the sensitive element remains substantially constant.

2. The sensor as claimed in claim 1, the cylindrical hole having a circular transverse cross section.

3. The sensor as claimed in claim 1, the bottom of the recess defining a transverse plane perpendicular to the axis of the cylindrical hole.

4. The sensor as claimed in claim 3, the transverse plane forming an end stop for the movement of the Hall-effect probe along the axis of the cylindrical hole.

5. The sensor as claimed in claim 1, the movement of the probe taking place exclusively outside the hole.

6. The sensor as claimed in claim 1, the cylindrical hole being blind.

7. The sensor as claimed in claim 1, the recess having a parallelepipedal shape.

8. The sensor as claimed in claim 1, the magnet and the Hall-effect probe being not rigidly coupled.

9. The sensor as claimed in claim 1, the Hall-effect probe being able to move in a direction parallel with the axis of the hole and/or in a plane perpendicular to said axis.

10. The sensor as claimed in claim 9, the Hall-effect probe moving exclusively in planes perpendicular to said axis.

11. The sensor as claimed in claim 1, further comprising a support, wherein the magnet and the Hall-effect probe are each linked to the support.

* * * * *